United States Patent
Ansell et al.

(10) Patent No.: US 6,368,522 B1
(45) Date of Patent: Apr. 9, 2002

(54) MOLD FOR FORMING A CONTACT LENS AND METHOD OF PREVENTING FORMATION OF SMALL STRANDS OF CONTACT LENS MATERIAL DURING CONTACT LENS MANUFACTURE

(75) Inventors: Scott Frederick Ansell, Jacksonville, FL (US); Jan Albert Maria Windey, Lommel (BE); Kenneth W. Foley, Jr., Fruit Cove, FL (US); Gerald Robert Krebsbach, Jacksonville, FL (US); Robert MacDonald Smith, Jacksonville, FL (US); Carl G. Crowe, Jr., Jacksonville, FL (US)

(73) Assignee: Johnson & Johnson Vision Care, Inc., Jacksonville, FL (US)

( * ) Notice: Subject to any disclaimer, the term of this patent is extended or adjusted under 35 U.S.C. 154(b) by 0 days.

(21) Appl. No.: 09/476,273

(22) Filed: Jan. 3, 2000

(51) Int. Cl.[7] ............................................. B29D 11/00
(52) U.S. Cl. ....................................... 264/1.1; 264/500
(58) Field of Search ........................... 264/1.1, 2.2, 2.5, 264/500; 425/808; 249/117, 160

(56) References Cited

U.S. PATENT DOCUMENTS

| | | | |
|---|---|---|---|
| 2,961,108 A | 11/1960 | Johnson | 215/37 |
| 3,117,608 A | 1/1964 | Goss et al. | 150/35 |
| 3,374,982 A | 3/1968 | Sallade | |
| 3,684,234 A | 8/1972 | Clinebell | |
| 3,981,841 A | 9/1976 | Abolins et al. | |
| 4,044,889 A | 8/1977 | Orentreich et al. | 206/459 |
| 4,054,624 A | 10/1977 | Le Boeuf et al. | 264/1 |
| 4,113,224 A | 9/1978 | Clarke et al. | 249/105 |
| 4,121,896 A | 10/1978 | Shepherd | 425/412 |
| 4,197,266 A | 4/1980 | Clarke et al. | 264/1 |
| 4,209,289 A | 6/1980 | Newcomb et al. | 425/410 |
| 4,211,384 A | 7/1980 | Bourset et al. | 249/160 |

(List continued on next page.)

FOREIGN PATENT DOCUMENTS

| | | |
|---|---|---|
| EP | 328246 A3 | 1/1989 |
| EP | 561480 A3 | 10/1989 |
| EP | 447361 A1 | 3/1991 |
| EP | 472303 A2 | 7/1991 |
| EP | 472303 A3 | 7/1991 |
| EP | 604176 A1 | 12/1993 |
| EP | 785854 B1 | 1/1999 |
| EP | 970801 A2 | 6/1999 |
| EP | 979725 A2 | 8/1999 |
| EP | 970801 A1 | 1/2000 |
| EP | 1040907 A2 | 3/2000 |
| GB | 2 230 730 | * 10/1990 |
| WO | 8704390 | 7/1987 |
| WO | WO9002496 | 3/1992 |
| WO | WO95/111 | 4/1995 |
| WO | WO95/20483 | 8/1995 |
| WO | 0012296 | 3/2000 |

*Primary Examiner*—Mathieu D. Vargot
(74) *Attorney, Agent, or Firm*—Anne B. Kiernan

(57) ABSTRACT

This invention provides a mold for forming a contact lens including an overflow collector, which causes the overflow reactive mixture to be accumulated, and not to spread out as it would upon the typically flat surface of a prior art mold. This invention further provides a method of preventing the formation of contaminating pieces of overflow reactive mixture comprising the step of: preventing the overflow reactive mixture from spreading out on the mold.

23 Claims, 4 Drawing Sheets

U.S. PATENT DOCUMENTS

| | | |
|---|---|---|
| 4,247,492 A | 1/1981 | Neefe |
| 4,407,766 A | 10/1983 | Haardt et al. ................. 264/2.2 |
| 4,435,912 A | 3/1984 | Adrian et al. ................. 40/365 |
| 4,495,117 A | 1/1985 | Feurer et al. |
| 4,545,479 A | 10/1985 | Figari .......................... 206/5.1 |
| 4,565,348 A | 1/1986 | Larsen ......................... 249/122 |
| 4,623,249 A | 11/1986 | Gramt ......................... 356/124 |
| 4,640,489 A | 2/1987 | Larsen ......................... 249/122 |
| 4,698,089 A | 10/1987 | Matsuzaka et al. |
| 4,710,023 A | 12/1987 | Loveridge ................... 356/244 |
| 4,784,258 A | 11/1988 | Figari .......................... 206/5.1 |
| 4,786,444 A | 11/1988 | Hwang ........................ 264/1.4 |
| 4,805,680 A | 2/1989 | Ueno .......................... 150/147 |
| 4,815,690 A | 3/1989 | Shepherd |
| 4,865,779 A | 9/1989 | Ihn et al. ..................... 264/1.1 |
| 4,955,580 A | 9/1990 | Seden et al. .................. 249/82 |
| 5,015,280 A | 5/1991 | Kimoto et al. |
| 5,064,082 A | 11/1991 | Lombardi et al. ............. 215/6 |
| 5,076,683 A | 12/1991 | Glick .......................... 351/160 |
| 5,087,015 A | 2/1992 | Galley |
| 5,099,987 A | 3/1992 | Bieri .......................... 206/5.1 |
| 5,110,278 A | 5/1992 | Tait et al. ................... 425/175 |
| 5,143,660 A * | 9/1992 | Hamilton et al. ............ 264/2.2 |
| 5,158,718 A | 10/1992 | Thakrar et al. ............... 264/1.4 |
| 5,236,636 A | 8/1993 | Tisack ......................... 264/22 |
| 5,238,388 A | 8/1993 | Tsai ............................ 425/412 |
| 5,246,259 A | 9/1993 | Hellenkamp et al. ........ 294/1.2 |
| 5,252,056 A | 10/1993 | Horner et al. ............... 425/555 |
| 5,264,161 A | 11/1993 | Druskis et al. ............... 264/2.6 |
| 5,309,279 A | 5/1994 | Halstead ..................... 359/442 |
| 5,326,505 A | 7/1994 | Adams et al. ................ 264/1.4 |
| 5,337,888 A | 8/1994 | Morrison .................... 206/5.1 |
| 5,412,199 A | 5/1995 | Finkelstein et al. ......... 235/487 |
| 5,434,405 A | 7/1995 | Finkelstein et al. ......... 235/487 |
| 5,466,147 A | 11/1995 | Appleton et al. ............ 425/412 |
| 5,540,410 A | 7/1996 | Lust et al. ................... 249/134 |
| 5,590,782 A | 1/1997 | Haber et al. ................ 206/528 |
| 5,593,620 A * | 1/1997 | Galas .......................... 264/1.1 |
| 5,690,973 A | 11/1997 | Kindt-Larsen et al. ...... 425/436 |
| 5,733,585 A | 3/1998 | Vandewinckel et al. .... 425/192 |
| 5,975,875 A | 11/1999 | Crowe, Jr. et al. .......... 425/215 |
| 5,999,336 A | 12/1999 | Yang, Jr. ..................... 359/742 |
| 6,036,017 A | 3/2000 | Bayliss, IV ................. 206/534 |
| 6,092,646 A | 7/2000 | Glazier ....................... 206/5.1 |

* cited by examiner

FIG. 1 <u>PRIOR ART</u>

MOLD FOR FORMING A CONTACT LENS AND METHOD OF PREVENTING FORMATION OF SMALL STRANDS OF CONTACT LENS MATERIAL DURING CONTACT LENS MANUFACTURE

FIELD OF THE INVENTION

This invention relates to a mold used for forming a contact lens and for a method of preventing the formation of small strands of contact lens material from the overflow of the contact lens mold during contact lens manufacture.

BACKGROUND OF THE INVENTION

One way to manufacture soft contact lenses is to mold contact lenses in plastic molds. Typically there are two mold portions which when assembled form a cavity between the mold portions. A reactive mixture which reacts within the cavity forms a contact lens. Typically a first mold portion is dosed with the reactive mixture, and the second mold portion is placed on the first mold portion, and then the reactive mixture is reacted. The placement of the second mold portion onto the first mold portion typically causes excess reactive mixture to overflow the cavity contacting one or both mold portions. The mold portions commonly have flat flanges, and the excess reactive mixture commonly spreads out between the flanges of the two mold portions. The reaction of the reactive mixture is commonly radiation activated. The reactive mixture in the cavity reacts e.g. polymerizes and/or crosslinks to form the contact lens and the overflow reacts, to form an annular ring of polymer. In the typical manufacturing process the overflow area on the first mold portion (located on the bottom), which is the surface area of the first mold portion which the overflow reactive mixture will contact, receives an application of a surfactant prior to the dosing step. The surfactant prevents the overflow material from adhering to the first mold portion, and thereby helps the overflow material to adhere to the second mold portion and be removed from the manufacturing process when the second mold portion is removed from the first mold portion, referred to as the de-mold step. The second mold portion is then discarded. The contact lens stays in the first mold portion which continues in the contact lens manufacturing process to the hydration and washing step or steps. The hydration and washing step or steps have been disclosed in the prior art, including U.S. Pat. Nos. 5,640,980; and 5,690,866, incorporated herein by reference.

During the hydration and washing step(s), any residual reactive monomer overflow, which if present is usually a thin or small piece which broke off from the bigger piece (which adhered to the second mold portion) washes off the first mold portion flange and may attach itself to a contact lens, which may later cause the contact lens to be rejected.

Typically the dosing and reacting steps occur in an inert environment; however, recently it was discovered that contact lenses can be manufactured in an ambient environment as long as the time between dosing the reactive mixture into the first mold portion and the placement of the second mold portion onto the first mold portion is less than 70 seconds. The process of manufacturing contact lenses in an ambient environment was disclosed in U.S. patent Ser. No. 09/222,266, now U.S. Pat. No. 6,241,918, incorporated herein by reference. The reactive mixture which forms the contact lens within the mold is not effected by the oxygen in the ambient environment once the second mold portion is placed on the first mold portion, because within the closed mold, the reactive mixture is sealed away from the ambient environment; however, the overflow reactive mixture on the flange is exposed to the oxygen in the ambient environment which may interfere with and prevent the fall reaction, e.g. polymerization, of the reactive mixture. It is suspected that this may be causing a greater formation of thin pieces of the reactive mixture which do not react fully and often break away from the rest of the overflow material. The small pieces of the partially polymerized reactive mixture do not adhere to the second mold portion at the time the second mold portion is removed from the first mold portion during the de-mold step. Instead the small pieces tend to find their way to and stick to the contact lenses during the subsequent hydration and/or washing step(s).

This invention addresses the problem of the pieces of reactive mixture which break off from the rest of the overflow and/or are not removed with the second mold portion, and/or are not easily removable from the mold portions. This invention is useful for any contact lens manufacturing line, e.g. the reaction occurs in an inert or ambient environment.

SUMMARY OF THE INVENTION

This invention provides a mold for forming a contact lens comprising an overflow collector. The overflow collector is a volume preferably at least partly defined by a structure which causes the overflow reactive mixture to be accumulated, and not to spread out as it would upon the typically flat surface of a prior art mold. The overflow collector also reduces the amount of the surface area of the overflow that contacts the ambient or inert environment, preferably the overflow collector reduces the surface area of the overflow that contacts the ambient or inert environment by more than twenty-five percent as compared to a mold having a flat overflow area, more preferably by more than fifty percent as compared to a mold having a flat overflow area. The overflow collector assists in the removal of the overflow reactive mixture from the contact lens manufacturing process. The overflow collector preferably prevents the formation of thin strands of reactive mixture. This overflow collector preferably assists in the adhesion of the overflow reactive mixture to at least one of the mold portions.

This invention further provides a method of preventing the formation of contaminating pieces, typically thin strands of overflow reactive mixture comprising the step of: preventing the overflow reactive mixture from spreading out on the mold. The thin strands usually have dimensions between 40 to 1,000 microns. This method also reduces the amount of the surface area of the overflow that contacts the ambient or inert environment. This method assists in the removal of the overflow reactive mixture from the contact lens manufacturing process. This method preferably prevents the formation of thin strands of reactive mixture. This method preferably assists in the adhesion of the overflow reactive mixture to at least one of the mold portions.

DETAILED DESCRIPTION OF THE INVENTION

Figure 1:
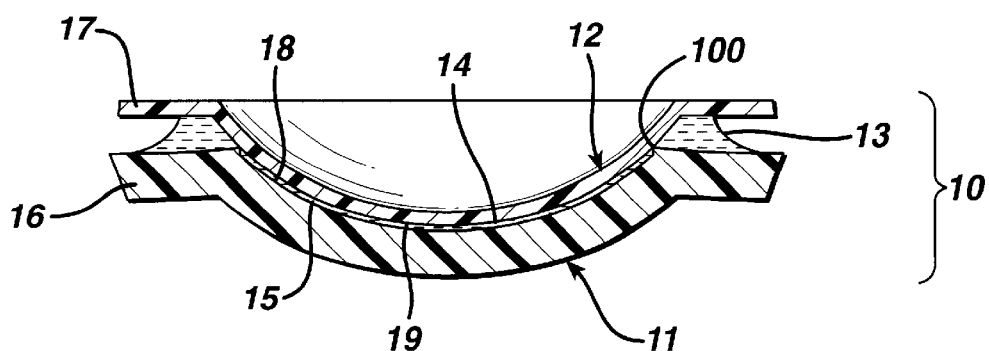
FIG. 1 shows a cross-section of a prior art contact lens mold.

FIG. 1 shows a cross-section of a prior art contact lens mold 10 which consists of a first mold portion 11, and a second mold portion 12. The mold 10 is shown assembled and dosed with a reactive mixture 15. Molds like the one shown and their use for molding contact lenses have been fully described in for example, U.S. Pat. Nos. 5,238,388; 5,326,505 and 5,540,410; incorporated herein by reference. Typically the mold portions comprise polystyrene, polypropylene, polyethylene or the like; however, more durable materials such as quartz or glass can be used to make the molds of this invention.

The first mold portion 11 and the second mold portion 12 define a cavity 14 within which a reactive mixture 15, e.g. reactive monomers or uncrosslinked polymers, react to form a contact lens. The reactive mixture 15 typically comprises a hydrogel forming composition, for example, it may comprise hydroxyethyl methacrylamide and/or other monomers, and crosslinkers, and/or other compositions which are fully disclosed in the prior art. The cavity 14 is defined by optical surface 18 of the first mold portion 11, the optical surface 19 of the second mold portion 12, and by the edge 100 on the first mold portion 11 which meets the optical surface 19 of the second mold portion 12. The optical surface 19 forms the back surface of the contact lens, that is, the surface which is against the eye, and the optical surface 18 forms the front curve of the contact lens. For this reason the first mold portion 11 is often referred to in the prior art as the front curve mold, and the second mold portion 12 is often referred to as the back curve mold in the prior art. Typically, the quantity of the reactive mixture 15 which is dosed into the first mold portion 11 is too large for the cavity 14 and forms an overflow 13 when the first mold portion 11 and the second mold portion 12 are assembled to form the mold 10. The overflow 13 spreads out between the flanges 16, 17 of the mold portions. Ideally, the overflow 13 reacts, e.g. polymerizes and/or crosslinks to form an annular ring of polymer which adheres to the second mold portion 12 due to the application of a surfactant to the flange 16 of the first mold portion 11. The overflow 13 can then be removed from the manufacturing process during the de-mold step when the second mold portion 12 is removed from the first mold portion 11 and discarded. However, if the reactive mixture spreads out too thinly, or perhaps due to the effect of the environment, the overflow 15 is not fully removed in the de-mold step and instead breaks into one or more small pieces, which contaminate the downstream manufacturing process of contact lenses.

This invention provides a mold for forming a contact lens having an overflow collector. The mold can comprise one or more mold portions. Typically the mold will comprise two mold portions as described above for the prior art mold; however, this invention is applicable to other molds for manufacturing contact lenses. The mold may comprise a single mold portion, or the mold may comprise more than two portions, one of which may be present to define the overflow collector. Preferably, the mold is disposable; however, this invention includes reusable molds.

Figure 2:
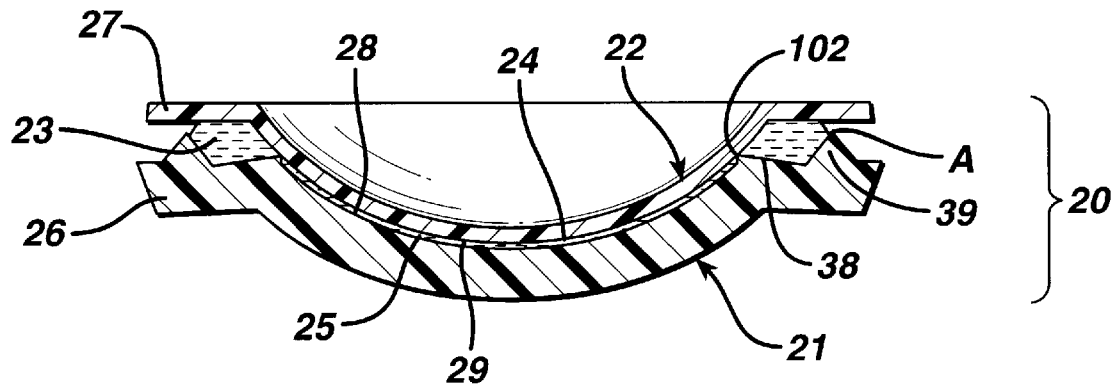
FIG. 2 shows a cross-section of a contact lens mold of this invention.
Figure 3:
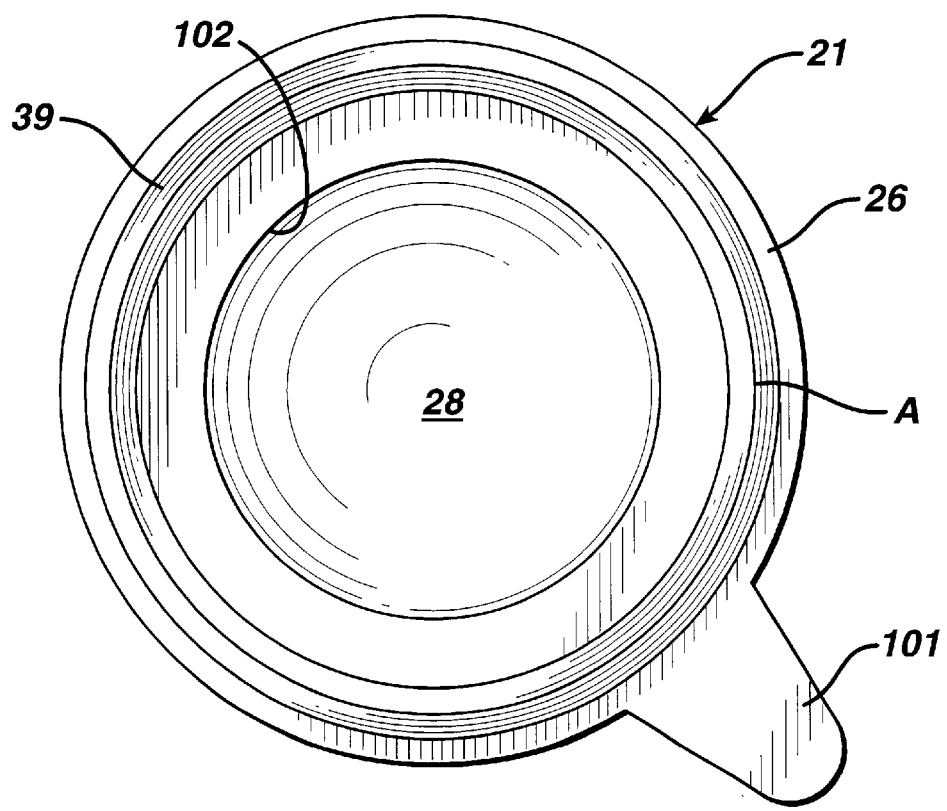
FIG. 3 shows a top view of the first mold portion of the contact lens mold shown in FIG. 2.

One embodiment of this invention of a mold which provides an overflow collector 38 is shown in FIG. 2. The overflow collector 38 is shaped like a trough and its volume is partly defined by a structure 39, i.e., a protrusion 39 from the surface of the flange 26 of the first mold portion 21. The overflow collector is additionally defined by the flange 26 from the edge 102 to the protrusion 39, by the optical surface 29 of the second mold portion 22 which is outside of the cavity 24, and by part of the bottom side of the flange 27 of the second mold portion 22. The protrusion 39 is preferably present continuously around the flange 26, although the size and shape of the overflow collector 38 may vary if desired, and does not have to be present around the entire flange 26. (Note that FIG. 3 shows an optional tab 101, which is an extension of the flange 26, and which is not present in the cross-sectional view of the mold. The tab 101 assists in the handling of the mold portion.) The protrusion 39 can be located anywhere on the flange 26 depending upon the amount of overflow 23. For a smaller amount of overflow 23, the overflow collector 38 is preferably made smaller by locating the protrusion 39 closer to the edge 102. When the overflow 23 is a greater amount, the overflow collector 38 is preferably made larger by locating the protrusion 39 further away from the edge 102. The height of the protrusion 39 should preferably be as high as it can be manufactured. If necessary other requirements for the mold portions may need to be considered when designing the structure, such as the ability to apply a surfactant to the surface of the first mold portion and the subsequent use of mechanical fingers between the mold portions in the de-mold step. Additionally, the assembly of the mold needs to be considered. Preferably the protrusion 39 should not interfere with the assembly of the contact lens mold 20, e.g., the protrusion 39 should not interfere with the placement of the second mold portion 22 on the first mold portion 21, unless the protrusion 39 is flexible and will allow the mold to contract if necessary during the reaction step. The volume of the overflow collector 38 should preferably be such that it can contain all the overflow 23, that is, that it does not let the reactive mixture overflow 23 past point A on the protrusion 39.

The protrusion 39 can have any shape, and can comprise any material. The protrusion 39 is shown having a triangular shape; however, it could be rectangular, semi-elliptical, or semi-circular. Presently, the mold portions including the protrusion 39 are made by injection molding so it is preferred that the protrusion 39 is shaped so that it tapers away from the surface of the flange 26 to make it easier to mold; however, for mold portions that are not made by injection molding, the protrusion can have any shape, and does not have to taper away from the flange. For example, the mold portion having the protrusion could be made of machined quartz or the protrusion could be made of rubber or a separate piece of plastic and subsequently adhered to a mold portion.

It is desired that the overflow 23 adheres to and is removed with the second mold portion 22 when the second mold portion 22 is removed from the first mold portion 21 during the de-mold step in the preferred contact lens manufacturing process; therefore, it is preferred to design the mold 20 and the boundaries of the overflow collector 38 so that the surface area of the second mold portion 22 contacting the overflow 23 is equal to or greater than the surface area of the first mold portion 21 contacting the overflow 23. This, however, is not a requirement, because the adhesion of the overflow 23 to the second mold portion 22 can be accomplished by the use of surfactant, or by other surface treatment chemicals or methods, on the first mold portion 21 or the second mold portion 22.

In the presently preferred embodiment shown in FIGS. 2 and 3, the protrusion is preferably located from 1 to 1.5 mm, more preferably 1.25 mm from edge 102, and is preferably from 0.3 and 0.4 mm, more preferably 0.35 mm in height measured from the surface of the flange 26 from which the protrusion 39 protrudes. The surface area of the second mold portion 22 which contacts the overflow 23 is about 75 mm$^2$, and the surface area of the first mold portion 21 which contacts the overflow 23 is about 55 mm$^2$. The optimum location and height of the protrusion for a particular amount of overflow and assembly can be determined by a person of ordinary skill in the art for the amount of overflow 23.

Figure 4:
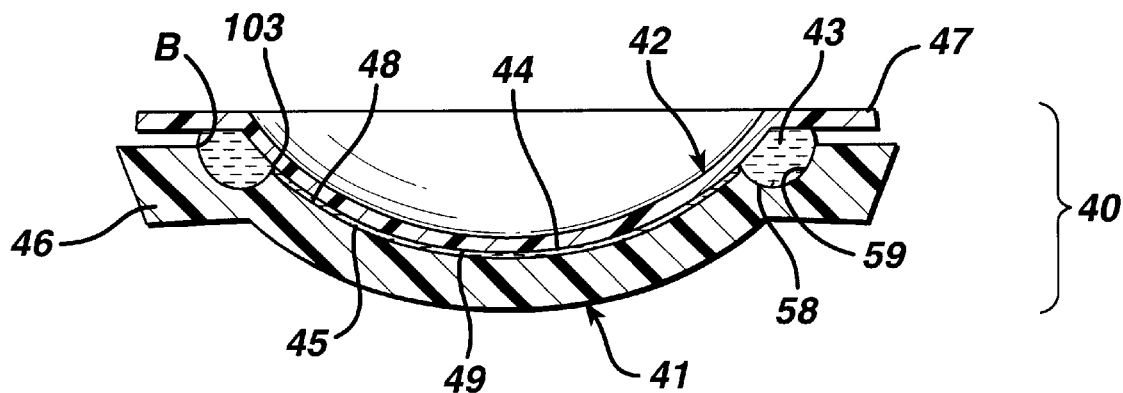
FIG. 4 shows a cross-section of a second embodiment of a contact lens mold of this invention.
Figure 5:
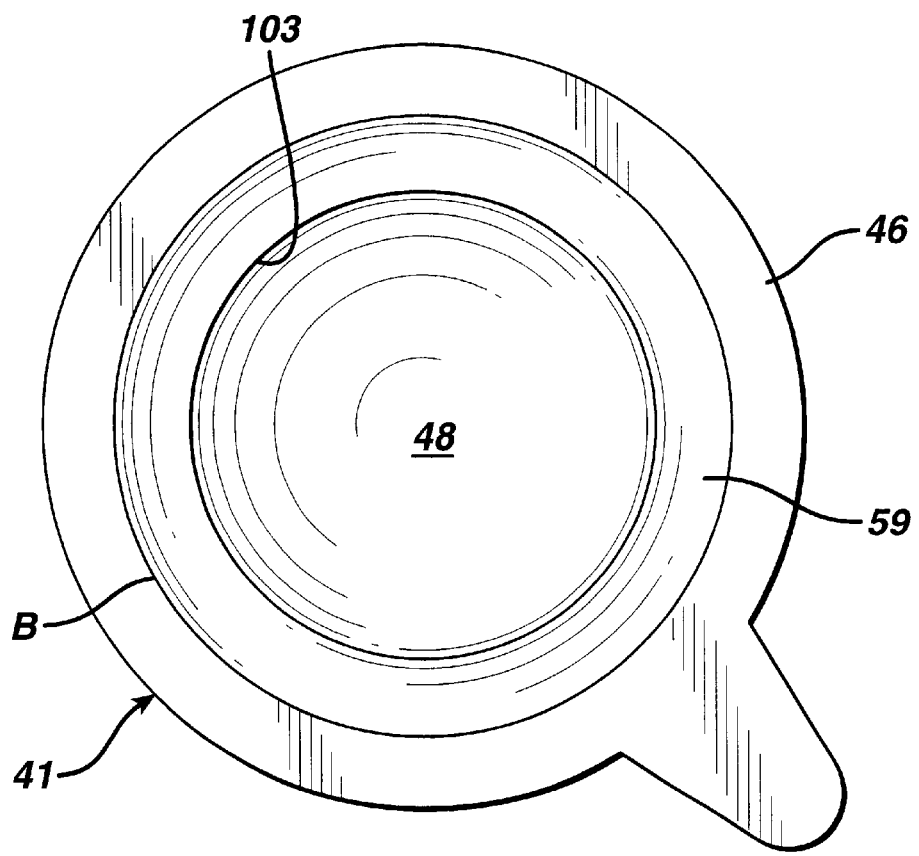
FIG. 5 shows a top view of the first mold portion of the contact lens mold shown in FIG. 4.

An alternative embodiment is shown in FIG. 4 and FIG. 5. The contact lens mold 40 comprises a first mold portion 41 comprising another structure 59, i.e. a depression 59 which defines one boundary of the overflow collector 58. The other boundaries include the optical surface 49 of the second mold portion 42 which is outside of the cavity 44, and by part of the bottom side of the flange 47 of the second mold portion 42. Optionally, in this embodiment, as shown, the flange 46 of the first mold portion 41 can be higher on the side of the depression 59 furthest from the cavity 44 to increase the size of the depression 59. Alternatively, a protrusion, like in the first embodiment, on the side of the depression 59 furthest from the cavity 44 could have been provided for the same purpose. The higher side and/or the protrusion preferably provides for the exposure of less surface area of the reactive mixture to the environment. The depression 59 is preferably present continuously around the flange 46, although the size and shape of the overflow collector 58 may vary if desired, and does not have to be present around the entire flange. The depression 59 can be any size depending upon the amount of overflow 43. For a smaller amount of overflow 43, the overflow collector 58 is preferably made smaller by making the depression smaller. When the overflow 43 is a greater amount, the overflow collector 58 is preferably made larger by increasing the size of the depression 59. For best results, it is preferred that the height of the far side of the depression 59 from the edge 103 should be as high as it can be manufactured without interfering with the assembly of the contact lens mold 40, taking into account other process requirements too. The volume of the overflow collector 58 should preferably be such that it can contain all of the overflow 43, that is, that it does not let the reactive mixture past point B of the depression 59.

The depression 59 can have any shape. The depression 59 is shown having a semi-elliptical shape; however, it could be triangular, rectangular or semi-circular. Presently, the mold portions are made by injection molding so it is preferred that the depression 59 is shaped so that it tapers away from the surface of the flange 41 to make it easier to mold; however, for mold portions that are not made by injection molding, for example machined quartz, the depression can have any shape, and does not have to taper away from the flange. It is preferred that the depression 59 located on the first mold portion 41 tapers, and that the shape of the depression 59 is wider towards the second mold portion 42, because it is desired that the overflow 43 adheres to and is removed with the second mold portion 42 when the second mold portion 42 is removed from the first mold portion 41 during the de-mold step in the preferred contact lens manufacturing process. The optimum depth, height and design of the depression for a particular amount of overflow and assembly can be determined by a person of ordinary skill in the art for the amount of overflow.

Figure 6:
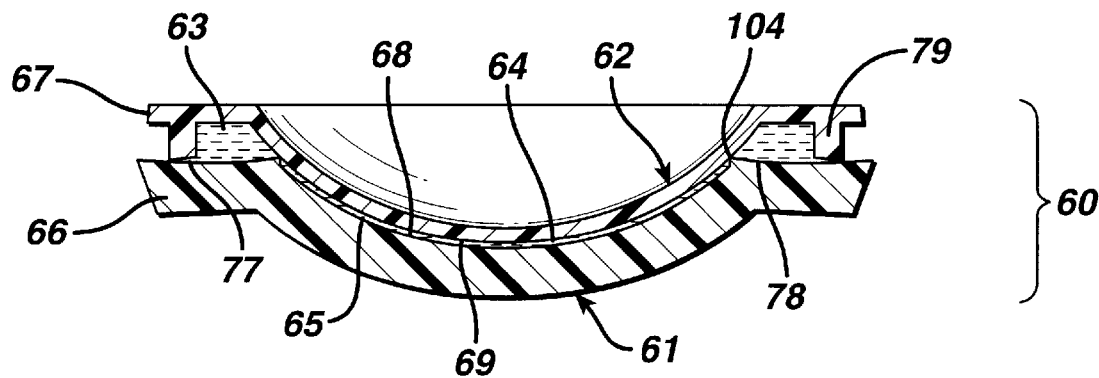
FIG. 6 shows a cross-section of a third embodiment of a contact lens mold of this invention.
Figure 7:
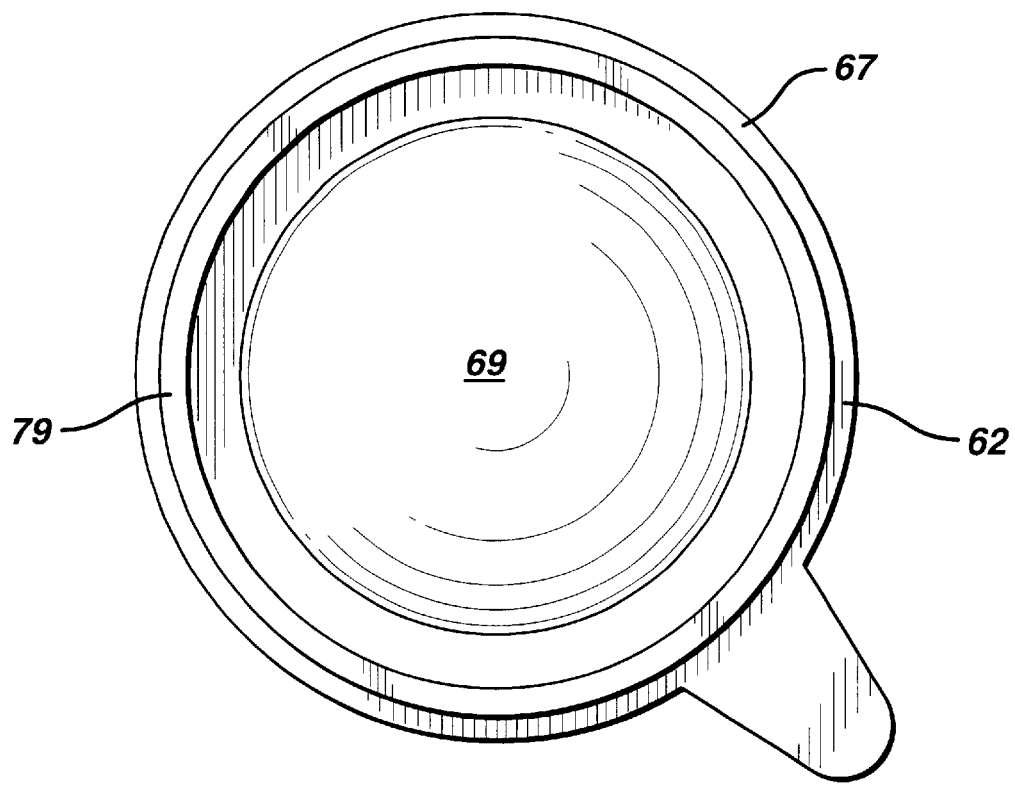
FIG. 7 shows a bottom view of the second mold portion of the contact lens mold shown in FIG. 4.

An alternative embodiment is shown in FIGS. 6 and 7. FIG. 6 shows the mold 60 comprising the first mold portion 61 and the second mold portion 62. The second mold portion 62 has a structure 79, i.e., a protrusion 79 which meets or nearly meets the surface of flange 66 of the first mold portion 61 and defines the overflow collector 78. Other boundaries to the overflow collector 78 include portions of the surfaces of the flanges 66, 67 and the optical surface 69. In this embodiment, it is important that the protrusion 79 meets or nearly meets the flange 66, to prevent the overflow 63 from flowing under the protrusion 79. If the protrusion 79 nearly meets the flange 66 of the first mold portion 61, it is preferred that the protrusion 79 has a rectangular shape as shown so that the leading edge of the overflow 63 will be trapped and stopped in the space 77 between the protrusion 79 and the flange 66. If the protrusion 79 meets the flange 66, (not shown) it is preferred that the protrusion 79 and/or the flange 67 and/or the flange 66 is/are flexible, to allow for contraction of the mold 60 during the reaction of the reactive mixture, if necessary. A flexible protrusion 79 and/or flange, 66, 67 can be provided by molding a thin piece of plastic. Alternatively, a flexible protrusion 79 can be provided by using a different material, such as rubber, to form the protrusion 79 which can be adhered to the flange 67. The protrusion 79 is shown as having a rectangular shape; however, like for the protrusion described in the earlier embodiment, it can have any shape. A protrusion 79 which is part of or adhered to the second mold portion 62 provides the benefit of increased surface area for the overflow 63 to cling to which will assist in the removal of the overflow 63 with the second mold portion 62 in the de-mold step.

The structures described and shown above are protrusions and depressions, however any structure or combination of structures can be used to define or partly define an overflow collector. For example, in alternative embodiments, not shown, the overflow collector could be defined by structures, e.g. protrusions on both the first mold portion and the second mold portion, and if desired the structures could be shaped to fit together, when the mold is assembled. In other embodiments, particularly when the molds are reusable, the structures could be formed from materials which differ from the materials used to form the mold portions, and/or could be materials to which the reactive mixture has an affinity to, such as, polystyrene. In an alternative embodiment the overflow collector can be defined by or partially defined by a structure separate from the mold, a third mold portion, for example, which can inserted between the flanges of the first mold portion and the second mold portion, preferably in a step either prior to or simultaneous with the placement of the second mold portion on the first mold portion to assemble the contact lens mold. In this embodiment, for example a flexible material ring comprising a rubber or spongy material would be desirable, to allow the mold portions to compress if necessary. Alternatively or additionally, making the structure out of a material to which the reactive mixture has an affinity would be beneficial. After the reaction step, and de-mold, the structure could be removed with the overflow attached, and discarded. The structure could have a cross-section, for example like a "U" on its side, which would provide additional surface area for the overflow to adhere to. The use of a disposable structure would be particularly desirable when reusable molds are used to form the contact lenses, because it would simplify the cleaning step before reuse.

This invention also provides a method of preventing the formation of thin strands of overflow reactive mixture comprising the step of: preventing the overflow reactive mixture from spreading out on one or more mold portions. The inventors have discovered that the problem with the overflow is that if it is allowed to spread out on the flange area, small pieces of the overflow may break away and contaminate later manufacturing steps. By preventing the reactive mixture from spreading out on the one or more mold portions then the likelihood of fully removing the overflow in the de-mold step will be increased. In addition to using an overflow collector defined by a physical structure as described above, the overflow collector could be defined by a pressure barrier, accomplished e.g. by blowing gas at the overflow between the flanges of the mold portions to prevent the overflow from spreading out. Alternatively, the overflow collector could be defined by a chemical barrier which would react with the leading edge and prevent it from spreading. The overflow could be removed from the mold by a separate washing step or wiping step, prior to the reaction step. In the washing step water can be directed at the mold between the flanges. In a wiping step a brush or the like can be used to remove the overflow from the flanges of the mold. In the presently preferred method of this invention a structure which at least partly defines an overflow collector, most preferably the protrusion shown in FIGS. 2 and 3 is used to prevent the spreading out of the overflow between the flanges.

This invention has been described for the preferred embodiments. Alternative embodiments, and modifications to the embodiments described above will be apparent to a person of ordinary skill in the art without departing from the principles and the spirit of the invention as defined by the following claims.

We claim:

1. A method of preventing the formation of contaminating pieces of overflow reactive mixture on a mold for forming a contact lens, said mold comprising an interior cavity and an exterior surface, comprising the steps of: dosing a reactive mixture into said cavity so that excess reactive mixture overflows the cavity onto said exterior surface of said mold, preventing said overflow reactive mixture from spreading out on said exterior surface of said mold, exposing said overflow reactive mixture present on said exterior surface to air, and reacting said reactive mixture in the interior cavity.

2. The method of claim 1 wherein said preventing step is accomplished by a mold comprising an overflow collector.

3. The method of claim 1, wherein said preventing step is accomplished by a mold comprising an overflow collector shaped like a trough.

4. The method of claim 1, wherein said preventing step is accomplished by a mold comprising an overflow collector at least partly defined by a structure.

5. The method of claim 1, wherein said preventing step is accomplished by a mold comprising an overflow collector at least partly defined by a protrusion from said mold.

6. The method of claim 5, wherein said protrusion is flexible.

7. The method of claim 4, wherein said structure is a depression in said mold.

8. The method of claim 4, wherein said mold comprises a first mold portion and a second mold portion and said structure is present on said first mold portion.

9. The method of claim 8, wherein said first mold portion comprises a flange, and said structure is present continuously around said flange.

10. The method of claim 9, wherein said structure is a protrusion from said flange, said protrusion having a triangular shape.

11. The method of claim 9, wherein said structure is a depression in said flange and further wherein said preventing step is accomplished by the step of collecting the excess reactive mixture in said depression.

12. The method of claim 4, wherein said mold comprises a first mold portion and a second mold portion and said structure is part of said first mold portion.

13. The method of claim 12, wherein said structure is a protrusion, said protrusion having a rectangular shape.

14. The method of claim 4, wherein said structure comprises a different material from said mold material.

15. The method of claim 4, wherein said structure is removable from said mold.

16. The method of claim 15, wherein said structure is a ring.

17. The method of claim 1, further comprising the step of removing said excess reactive mixture from said mold prior to said reacting step.

18. The method of claim 1, further comprising the step of removing said excess reactive mixture from said mold after said reacting step.

19. The method of claim 1, wherein said preventing step is accomplished by blowing gas at said excess reactive mixture.

20. The method of claim 18 further comprising the step of reusing said mold after said removing step.

21. The method of claim 1 further comprising the step of reacting said excess reactive mixture on said exterior surface.

22. The method of claim 1 wherein said preventing step is accomplished by a chemical barrier that reacts with said excess reactive mixture.

23. The method of claim 15 further comprising the step of removing said structure and said overflow reactive mixture from said mold after said exposing step.

* * * * *